United States Patent
Fan et al.

(10) Patent No.: US 10,810,399 B2
(45) Date of Patent: Oct. 20, 2020

(54) OPTICAL FINGERPRINT SENSING MODULE

(71) Applicant: Egis Technology Inc., Taipei (TW)

(72) Inventors: Chen-Chih Fan, Taipei (TW); Tong-Long Fu, Taipei (TW)

(73) Assignee: EGIS TECHNOLOGY INC., Taipei (TW)

( * ) Notice: Subject to any disclaimer, the term of this patent is extended or adjusted under 35 U.S.C. 154(b) by 0 days.

(21) Appl. No.: 16/505,606

(22) Filed: Jul. 8, 2019

(65) Prior Publication Data

US 2020/0019746 A1    Jan. 16, 2020

Related U.S. Application Data

(60) Provisional application No. 62/697,532, filed on Jul. 13, 2018.

(30) Foreign Application Priority Data

Nov. 7, 2018   (TW) .............................. 107139445 A

(51) Int. Cl.
   *G06K 9/00*       (2006.01)
   *G02B 5/20*       (2006.01)
(52) U.S. Cl.
   CPC ........... *G06K 9/0004* (2013.01); *G02B 5/208* (2013.01)
(58) Field of Classification Search
   CPC .. G06K 9/0004; G06K 9/209; G06K 9/00006; G06K 9/00046
   See application file for complete search history.

(56) References Cited

U.S. PATENT DOCUMENTS

| 2014/0110807 A1 | 4/2014 | Uekawa |
| 2017/0357840 A1 | 12/2017 | Chen et al. |
| 2018/0074627 A1 * | 3/2018 | Kong .................. G06K 9/00013 |
| 2019/0122025 A1 * | 4/2019 | Gove ................... G06K 9/0004 |
| 2019/0310724 A1 * | 10/2019 | Yeke Yazdandoost ...................... H01L 51/5275 |

FOREIGN PATENT DOCUMENTS

| CN | 107680988 A | 2/2018 |
| JP | 2009054095 A | 3/2009 |
| TW | I254389 | 5/2006 |
| TW | 201135303 | 10/2011 |

* cited by examiner

*Primary Examiner* — Koosha Sharifi-Tafreshi

(57) ABSTRACT

An optical fingerprint sensing module for sensing a fingerprint pattern of a finger is provided, wherein the finger is placed on a display panel module, and light is generated by the display panel module and reflected by the finger. The optical fingerprint sensing module includes a circuit board, an image sensor on the circuit board, a frame on the circuit board, a lens embedded in the frame, and an IR filter disposed above the image sensor. The image sensor is located in the frame, and the frame includes anti-infrared material. The lens corresponds to a sensing area of the display panel module. Light emitted from the display panel module is reflected by the finger located in the sensing area and then sequentially propagates through the lens and the IR filter to reach the image sensor.

16 Claims, 6 Drawing Sheets

OPTICAL FINGERPRINT SENSING MODULE

CROSS REFERENCE TO RELATED APPLICATIONS

This application claims the benefit of U.S. Provisional Application No. 62/697,532, filed on Jul. 13, 2018, and claims priority of Taiwan Patent Application No. 107139445, filed on Nov. 7, 2018, the entirety of which are incorporated by reference herein.

BACKGROUND OF THE INVENTION

Field of the Invention

The application relates in general to a fingerprint sensing module, and in particular, to an under-display fingerprint image sensing module.

Description of the Related Art

In recent years, biological identification technology has become increasingly mature, and different biological features can be used for identifying individual users. Since the recognition rate and accuracy of fingerprint identification technology are better than those of other biological feature identification technologies, fingerprint identification and verification are used extensively in various areas.

Fingerprint identification and verification technology detects a user's fingerprint pattern, captures fingerprint data from the fingerprint pattern, and saves the fingerprint data to the memory as a template, or directly saves the fingerprint pattern. Thereafter, the user presses or swipes a finger on or over the fingerprint sensor so that a fingerprint pattern is sensed and fingerprint data is captured, which can then be compared against the template or the stored fingerprint pattern. If the two match, then the user's identity is confirmed.

However, during the fingerprint sensing process, infrared light may cause noise interference that adversely influences the quality of the image captured by the image sensor and reduces the accuracy of fingerprint identification, especially in the field of under-display type fingerprint image sensing device. In the under-display type fingerprint image sensing device, a display, such as an OLED display, generates light to be reflected by a finger placed on the display and then sensed by the image sensor. The light emitted by the OLED display or other analogous light sources has low illumination level, and considerable noise interference may be caused even when a small quantity of infrared light enters the fingerprint image sensor. Therefore, it has become a challenge to reduce or eliminate noise interference caused by infrared light in the fingerprint sensing devices.

BRIEF SUMMARY OF INVENTION

In view of the aforementioned problems, an object of the invention is to provide an optical fingerprint sensing module for sensing a fingerprint pattern of a finger placed on an upper surface of a display panel module, wherein light is generated by the display panel module and reflected by the finger. The optical fingerprint sensing module includes a circuit board, an image sensor disposed on the circuit board, a frame, a lens, and an IR filter. The frame is disposed on the circuit board, wherein the image sensor is disposed in the frame, and the frame includes anti-infrared material. The lens is embedded in the frame and corresponding to a sensing area of the display panel module. The IR filter is disposed above the image sensor, wherein light emitted from the display panel module is reflected by the finger located in the sensing area and then sequentially propagates through the lens and the IR filter to reach the image sensor.

In some embodiments, the frame has a main body and a coating layer formed on the surface of the main body, wherein the coating layer includes anti-infrared material.

In some embodiments, the main body has an inner surface and an outer surface, and the coating layer is formed on the inner surface or the outer surface.

In some embodiments, the optical fingerprint sensing module further includes a plurality of micro-lenses, wherein the image sensor has a plurality of image sensing units corresponding to the micro-lenses for receiving light reflected by the finger.

In some embodiments, the optical fingerprint sensing module further includes an insulating layer formed on the image sensor and surrounding the micro-lenses, wherein the insulating layer includes anti-infrared material to prevent infrared light from entering the image sensor.

In some embodiments, the insulating layer is formed on the image sensor by chemical vapor deposition, evaporation, sputtering, coating, dispensing, electroplating, or electroless plating.

In some embodiments, the insulating layer and the image sensing units at least partially overlap along a direction parallel to the optical axis of the micro-lenses.

In some embodiments, the optical fingerprint sensing module further includes a bottom plate, wherein the circuit board is disposed on the bottom plate, and the hardness of the bottom plate is greater than the hardness of the circuit board.

In some embodiments, the IR filter includes an infrared cut-off filter sheet.

In some embodiments, the display element includes an OLED or TFT-LCD display element.

Another object of the invention is to provide an optical fingerprint sensing module for sensing a fingerprint pattern of a finger placed on an upper surface of a display panel module, wherein light is generated by the display panel module and reflected by the finger. The optical fingerprint sensing module includes a circuit board, a frame disposed on the circuit board, a lens, an image sensor, a plurality of micro-lenses, an insulating layer, and an IR filter. The lens is embedded in the frame and corresponding to a sensing area of the display panel module. The image sensor is disposed on the circuit board and located in the frame, wherein the image sensor has a plurality of image sensing units. The micro-lenses are disposed on the image sensor and corresponding to the image sensing units. The insulating layer is formed on the image sensor and surrounding the micro-lenses, to prevent infrared light from entering the image sensor. The IR filter is disposed above the image sensor, wherein light emitted from the display panel module is reflected by the finger located in the sensing area and then sequentially propagates through the lens, the IR filter and the micro-lenses to reach the image sensor.

In some embodiments, the insulating layer is formed on the image sensor by chemical vapor deposition, evaporation, sputtering, coating, dispensing, electroplating, or electroless plating.

In some embodiments, the insulating layer and the image sensing units at least partially overlap along a direction parallel to the optical axis of the micro-lenses.

In some embodiments, the optical fingerprint sensing module further includes a bottom plate, wherein the circuit board is disposed on the bottom plate, and the hardness of the bottom plate is greater than the hardness of the circuit board.

In some embodiments, the IR filter includes an infrared cut-off filter sheet.

In some embodiments, the display element includes an OLED or TFT-LCD display element.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The embodiments of an optical fingerprint sensing device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
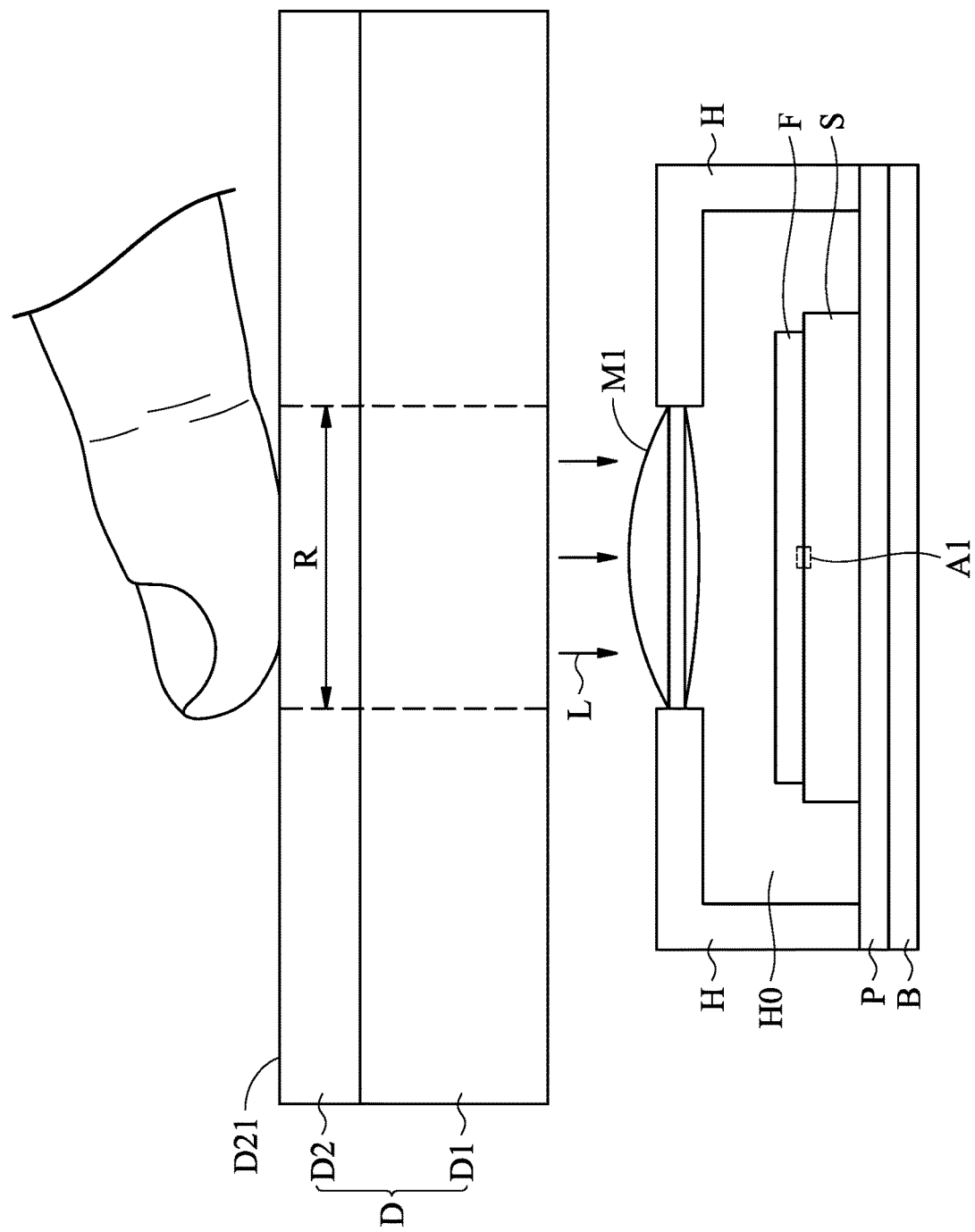
FIG. 1 shows a schematic diagram of an optical fingerprint sensing device in accordance with an embodiment of the invention.

FIG. 1 shows a schematic diagram of an optical fingerprint sensing device in accordance with an embodiment of the invention. As shown in FIG. 1, the optical fingerprint sensing device in this embodiment can be used to sense a fingerprint pattern of a finger. The optical fingerprint sensing device primarily comprises a display panel module D and an optical fingerprint sensing module disposed under the display panel module D. The optical fingerprint sensing module comprises a bottom plate B, a circuit board P, a frame H, a lens M1, an image sensor S and an IR filter F. The circuit board P is disposed on the bottom plate B, the frame H and the image sensor S are disposed on the circuit board P, and the lens M1 is received in an opening of the frame H.

In some embodiments, the image sensor S may comprise Charge Coupled Device (CCD) or CMOS Image Sensor (CIS), and the bottom plate B may comprise a plastic or metal substrate. Specifically, the hardness of the bottom plate B is greater than the hardness of the circuit board P, so as to provide sufficient support for the circuit board P and the image sensor S.

In this embodiment, the display panel module D comprises a display element D1 and a light permeable element D2 disposed on the display element D1. The light permeable element D2 may be a sheet glass, and the display element D1 may comprise Organic Light-Emitting Diodes (OLEDs), TFT-LCDs or touch display components. It should be noted that the display element D1 may include a plurality of light emitting units as light sources, thereby emitting light to pass through the light permeable element D2 to reach the finger thereon.

Still referring to FIG. 1, the frame H has a hollow structure and forms a receiving space H0 for receiving the image sensor S and the IR filter F. In this embodiment, the IR filter F may be an infrared cut-off filter sheet disposed on the image sensor S. Therefore, infrared light can be prevented from entering the image sensor S, so that the quality of the image generated by the image sensor S can be improved.

When using the optical fingerprint sensing device to capture a fingerprint pattern, the finger of a user can be placed within a sensing area R on a sensing surface D21 of the light permeable element D2. Subsequently, the light emitted from the light sources in the display element D1 can penetrate through the light permeable element D2 to reach the finger in the sensing area R, and the light is then reflected by the finger and bounces out of the display element D1, as the arrow L indicates in FIG. 1. The light finally propagates through the lens M1 and the IR filter F to reach the image sensor S.

When the image sensor S receives the light that passes through the lens M1 and the IR filter F, it can convert light signals into electrical signals, and the circuit board P can transfer the electrical signals to a processor (not shown), wherein the electrical signals include the fingerprint pattern information. Therefore, data storage and biological identification of the fingerprint pattern can be performed.

Figure 2:
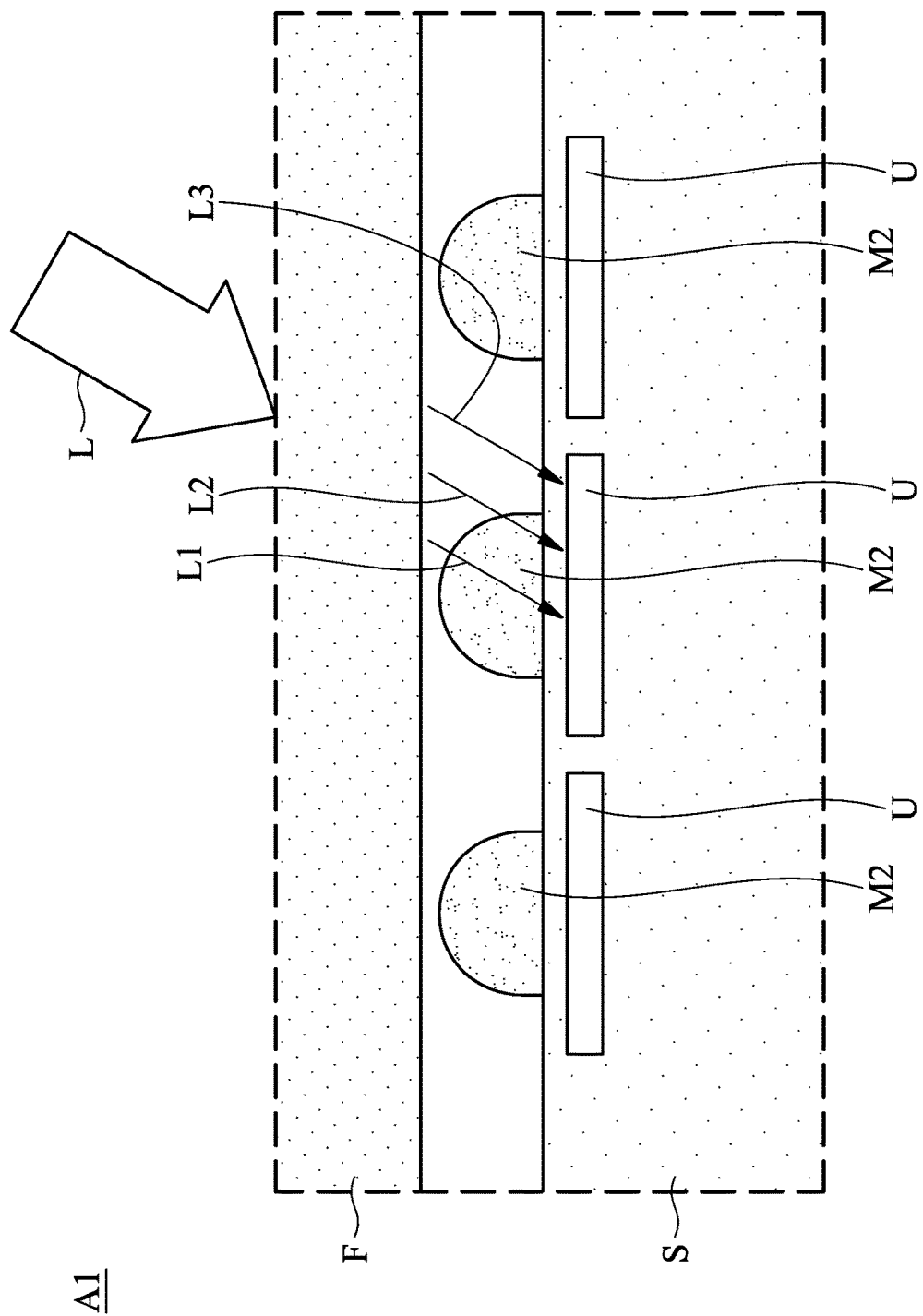
FIG. 2 shows an enlarged cross-sectional view of the portion A1 in FIG. 1.

FIG. 2 shows an enlarged cross-sectional view of the portion A1 in FIG. 1. Referring to FIG. 2, the IR filter F on the image sensor S can block most part of the infrared light emitted by the display element D1, whereby quality reduction of the image generated by the image sensor S due to infrared light noise can be efficiently prevented.

However, it is hard to entirely block the infrared light by the IR filter F, and a small part of the infrared light may still penetrate through the micro-lenses M2 to reach the image sensing units U inside the image sensor S, as the arrows L1 and L2 indicate in FIG. 2, wherein the micro-lenses M2 are disposed on a surface of the image sensor S. Moreover, a part of the infrared light may directly penetrates through the surface of the image sensor S to reach the image sensing units U without passing through the micro-lenses M2, as the arrow L3 indicates in FIG. 2. It should be noted that since the micro-lenses M2 and the surface of the image sensor S cannot block the infrared light, some infrared light may still enter the image sensing units U (as the arrows L1, L2 and L3 indicate in FIG. 2) and cause noise interference to adversely influence the image quality of the image sensor S.

Figure 3:
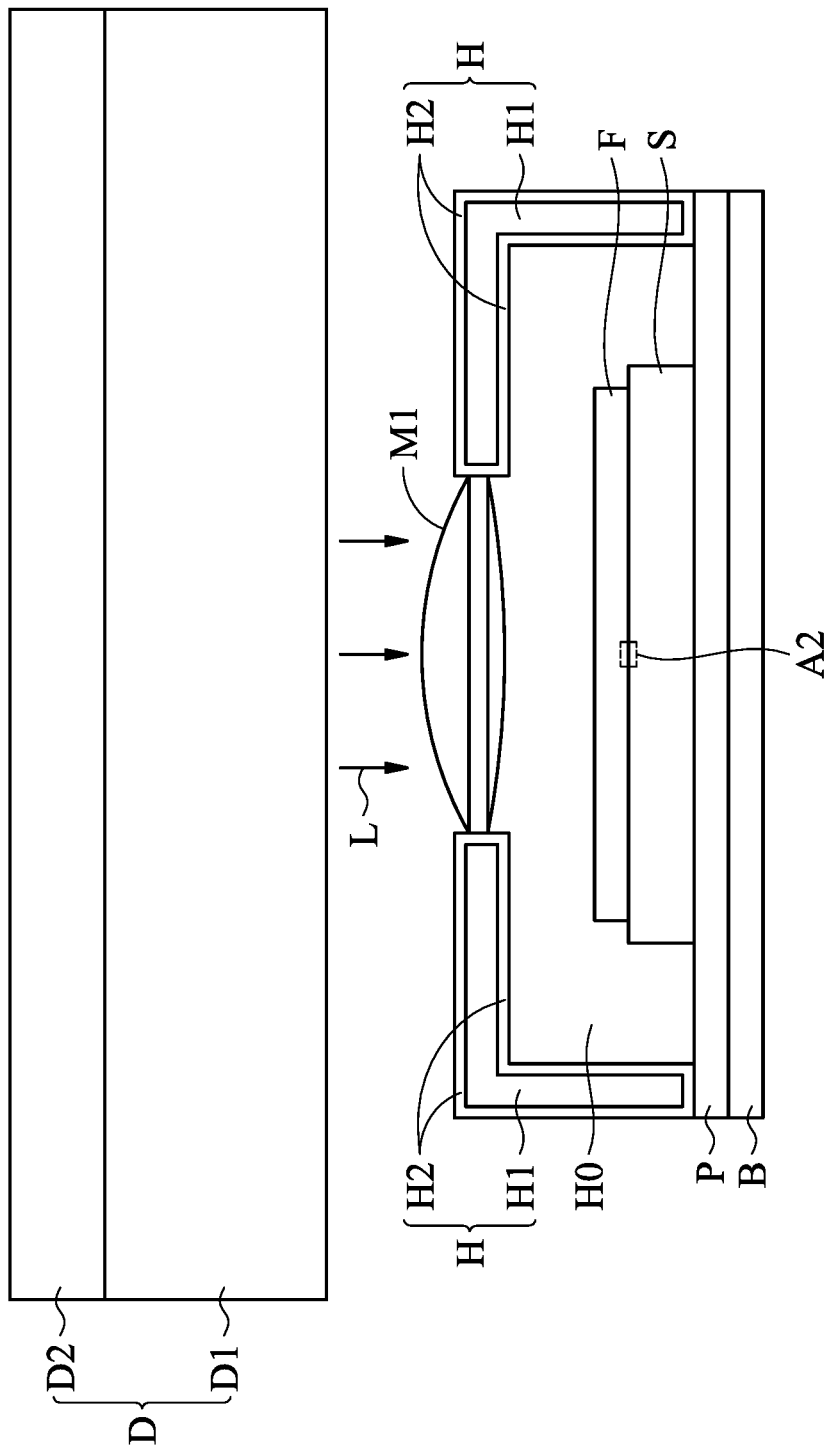
FIG. 3 shows a schematic diagram of an optical fingerprint sensing device in accordance with another embodiment of the invention.

FIG. 3 shows a schematic diagram of an optical fingerprint sensing device in accordance with another embodiment of the invention. As shown in FIG. 3, the optical fingerprint sensing device comprises a display panel module D, a bottom plate B, a circuit board P, a frame H, a lens M1, an image sensor S, and an IR filter F. The optical fingerprint sensing device in FIG. 3 is different from that in FIG. 1 since the frame H in FIG. 3 has a main body H1 and a coating layer H2 formed on the main body H1, wherein the coating layer H2 comprises anti-infrared material.

In this embodiment, the coating layer H2 may be an infrared cut-off filter coating layer coated on the main body H1 of the frame H. The infrared cut-off filter coating layer can efficiently prevent infrared light outside the frame H from entering the image sensor S inside the frame H.

Referring to FIG. 3, the coating layer H2 encompasses all the surfaces of the main body H1. In some embodiments, the coating layer H2 may be coated only on the inner or outer surface of the main body H1, so as to prevent infrared light outside the frame H from entering the image sensor S inside the frame H. In some embodiments, the frame H may comprise anti-infrared material to prevent infrared light outside the frame H from intruding into the frame H, thereby improving the quality of the image generated by the image sensor S.

Figure 4:
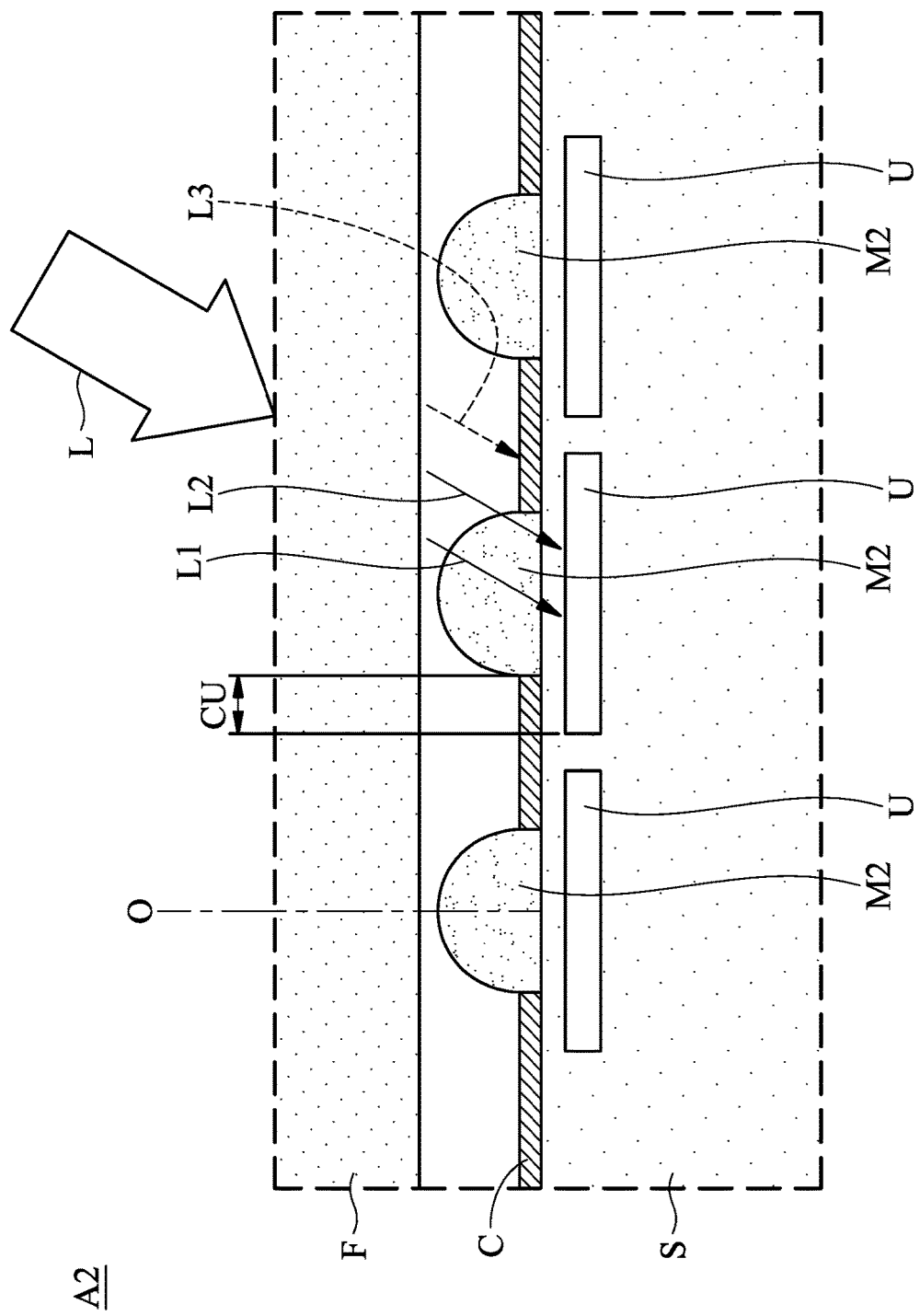
FIG. 4 shows an enlarged cross-sectional view of the portion A2 in FIG. 3.

FIG. 4 shows an enlarged cross-sectional view of the portion A2 in FIG. 3. In this embodiment, the frame H may comprise anti-infrared material (or have a coating layer H2 on the main body H1 of the frame H), and an insulating layer C is further formed on the surface of the image sensor S, wherein the insulating layer C comprises anti-infrared material. Therefore, the infrared light outside the image sensor S can be blocked from entering the image sensor S, and the image sensing units U of the image sensor S can be protected from noise interference caused by the infrared light.

In some embodiments, the insulating layer C may be formed on the surface of the image sensor S by a semiconductor manufacturing process, such as Chemical Vapor Deposition (CVD), chemical vapor deposition, evaporation, sputtering, coating, dispensing, electroplating, or electroless plating.

Figure 5:
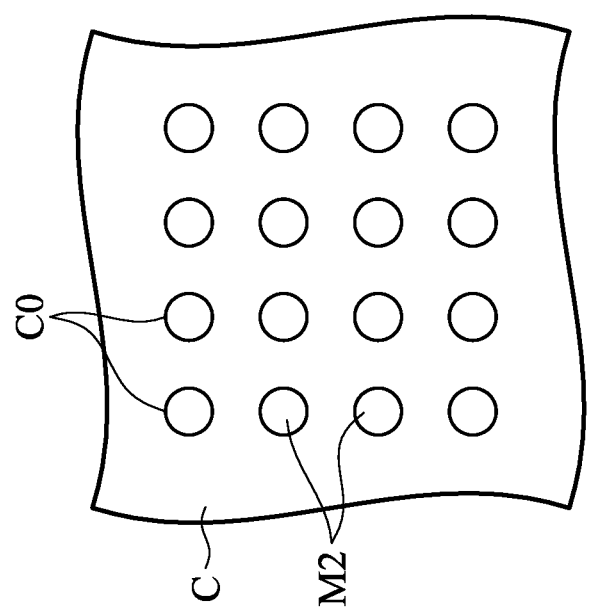
FIG. 5 is a top view showing a part of the insulating layer C that forms a plurality of holes C0 with a plurality of micro-lenses M2 received therein.

FIG. 5 is a top view showing a part of the insulating layer C that comprises a plurality of holes C0 to receive a plurality of micro-lenses M2. Referring to FIGS. 4 and 5, the insulating layer C is formed on the surface of the image sensor S and surrounds the micro-lenses M2, wherein the micro-lenses M2 are respectively accommodated in the holes C0. In some embodiments, the insulating layer C may comprise black photoresist which can block visible light and inferred light. In some embodiments, the insulating layer C may comprise an IR cut film to prevent infrared light outside the image sensor S from intruding into the image sensing units U inside the image sensor S through the surface of the image sensor S, as the arrow L3 indicates in FIG. 4.

It should be noted the insulating layer C and the image sensing units U inside the image sensor S at least partially overlap in a direction parallel to an optical axis O of the micro-lenses M2, as the overlapping area CU shown in FIG. 4.

Figure 6:
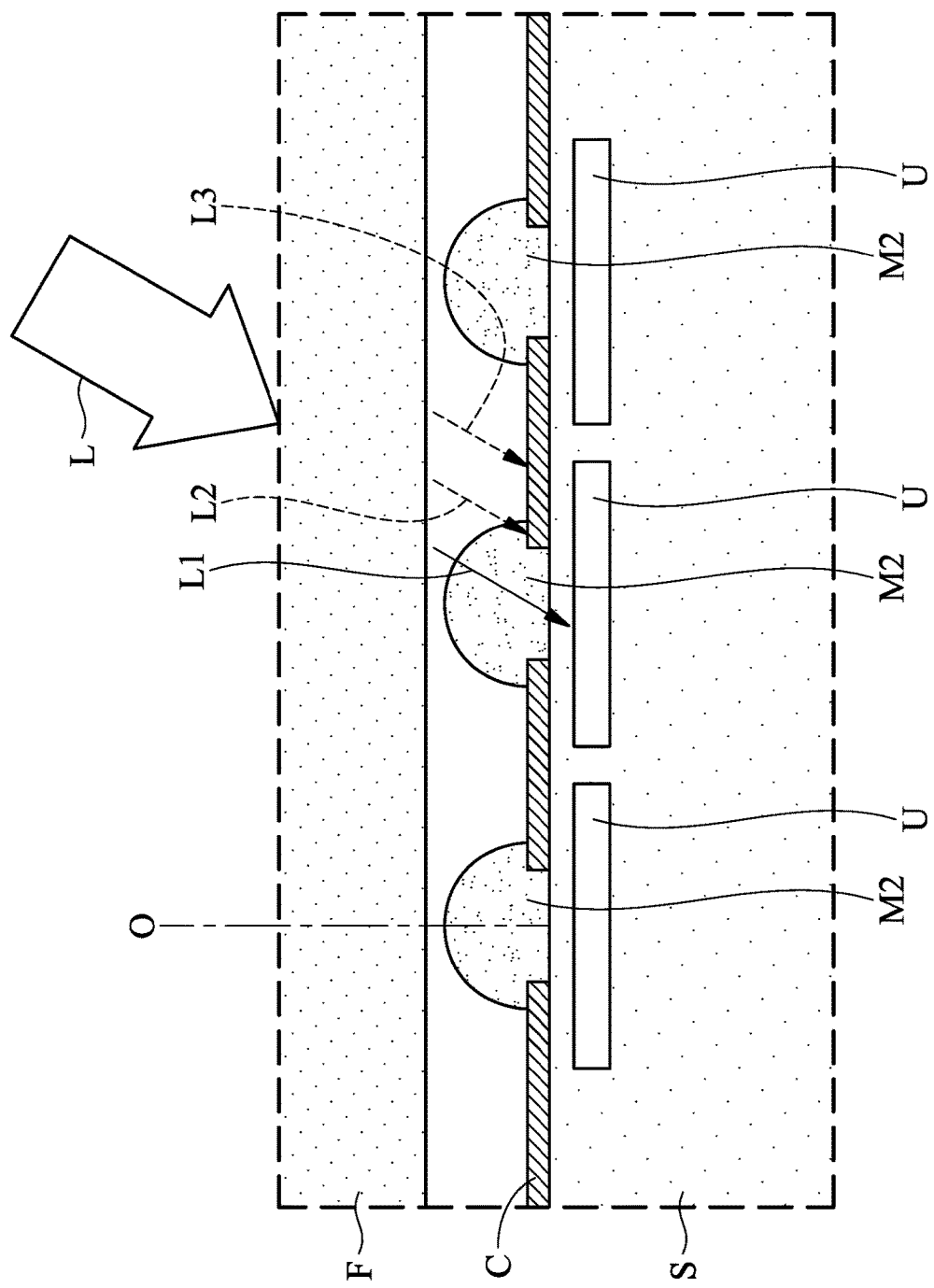
FIG. 6 shows an enlarged cross-sectional view of an optical fingerprint sensing device in accordance with another embodiment of the invention.

FIG. 6 shows an enlarged cross-sectional view of an optical fingerprint sensing device in accordance with another embodiment of the invention. The insulating layer C in this embodiment may comprise black photoresist or IR cut film, similar to the insulating layer C in FIG. 4. Specifically, the insulating layer C in FIG. 6 partially extends into the micro-lenses M2, so that a part of the infrared light which enters into the micro-lenses M2 can be blocked by the insulating layer C (as the arrow L2 shows in FIG. 6) and cannot reach the image sensing units U inside the image sensor S. Moreover, FIG. 6 also shows the insulating layer C and the image sensing units U inside the image sensor S at least partially overlap along the direction parallel to the optical axis O of the micro-lenses M2.

In FIG. 6, since the insulating layer C is formed on the surface of the image sensor S and partially extends into the micro-lenses M2, some of the infrared light outside the image sensor S can be blocked by the insulating layer C (as the arrows L2 and L3 indicate in FIG. 6), so that the image sensing units U of the image sensor S can be protected from noise interference, and the image quality of the image sensor S can be efficiently improved.

It should be realized that the IR filter F in FIGS. 1-6 can block most of the infrared light generated from the light sources, and the optical fingerprint sensing device in all the aforementioned embodiments is an under-display type fingerprint image sensing device that is an imaging sensor of low light level. Hence, when even a small quantity of infrared light enters the image sensor S, it may cause considerable noise and reduce the quality of the image.

In summary, the invention provides an IR filter F disposed above the image sensor S to block infrared light. In some embodiments, the frame H may comprise anti-infrared material, or an insulating layer C of anti-infrared material may be formed on the surface of the image sensor S. Therefore, the infrared light can be efficiently prevented from entering the image sensor S, whereby the quality of the image generated by the image sensor S and the accuracy of fingerprint identification can be improved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical fingerprint sensing module for sensing a fingerprint pattern of a finger placed on an upper surface of a display panel module, wherein light is generated by the display panel module and reflected by the finger, the optical fingerprint sensing module comprising:
   a circuit board;
   an image sensor, disposed on the circuit board;
   a frame, disposed on the circuit board, wherein the image sensor is disposed in the frame, and the frame comprises anti-infrared material;
   a lens, embedded in the frame and corresponding to a sensing area of the display panel module; and
   an IR filter, disposed above the image sensor, wherein light emitted from the display panel module is reflected by the finger located in the sensing area and then sequentially propagates through the lens and the IR filter to reach the image sensor.

2. The optical fingerprint sensing module as claimed in claim 1, wherein the frame has a main body and a coating layer formed on a surface of the main body, wherein the coating layer comprises anti-infrared material.

3. The optical fingerprint sensing module as claimed in claim 2, wherein the main body has an inner surface and an outer surface, and the coating layer is formed on the inner surface or the outer surface.

4. The optical fingerprint sensing module as claimed in claim 1, further comprising a plurality of micro-lenses, wherein the image sensor has a plurality of image sensing units corresponding to the micro-lenses for receiving light reflected by the finger.

5. The optical fingerprint sensing module as claimed in claim 4, further comprising an insulating layer formed on the image sensor and surrounding the micro-lenses, wherein the insulating layer comprises anti-infrared material to prevent infrared light from entering the image sensor.

6. The optical fingerprint sensing module as claimed in claim 5, wherein the insulating layer is formed on the image sensor by chemical vapor deposition, evaporation, sputtering, coating, dispensing, electroplating, or electroless plating.

7. The optical fingerprint sensing module as claimed in claim 4, wherein the insulating layer and the image sensing units at least partially overlap along a direction parallel to an optical axis of the micro-lenses.

8. The optical fingerprint sensing module as claimed in claim 1, further comprising a bottom plate, wherein the circuit board is disposed on the bottom plate, and the hardness of the bottom plate is greater than the hardness of the circuit board.

9. The optical fingerprint sensing module as claimed in claim 1, wherein the IR filter comprises an infrared cut-off filter sheet.

10. The optical fingerprint sensing module as claimed in claim 1, wherein the display element comprises an OLED or TFT-LCD display element.

11. An optical fingerprint sensing module for sensing a fingerprint pattern of a finger placed on an upper surface of a display panel module, wherein light is generated by the display panel module and reflected by the finger, the optical fingerprint sensing module comprising:
    a circuit board;
    a frame, disposed on the circuit board;
    a lens, embedded in the frame and corresponding to a sensing area of the display panel module;
    an image sensor, disposed on the circuit board and located in the frame, wherein the image sensor has a plurality of image sensing units;
    a plurality of micro-lenses, disposed on the image sensor and corresponding to the image sensing units;
    an insulating layer, formed on the image sensor and surrounding the micro-lenses, to prevent infrared light from entering the image sensor; and
    an IR filter, disposed above the image sensor, wherein light emitted from the display panel module is reflected by the finger located in the sensing area and then sequentially propagates through the lens, the IR filter and the micro-lenses to reach the image sensor.

12. The optical fingerprint sensing module as claimed in claim 11, wherein the insulating layer is formed on the image sensor by chemical vapor deposition, evaporation, sputtering, coating, dispensing, electroplating, or electroless plating.

13. The optical fingerprint sensing module as claimed in claim 11, wherein the insulating layer and the image sensing units at least partially overlap along a direction parallel to an optical axis of the micro-lenses.

14. The optical fingerprint sensing module as claimed in claim 11, further comprising a bottom plate, wherein the circuit board is disposed on the bottom plate, and the hardness of the bottom plate is greater than the hardness of the circuit board.

15. The optical fingerprint sensing module as claimed in claim 11, wherein the IR filter comprises an infrared cut-off filter sheet.

16. The optical fingerprint sensing module as claimed in claim 11, wherein the display element comprises an OLED or TFT-LCD display element.

* * * * *